(No Model.)
F. C. CHASE.
WRIST PIN FOR ENGINES.
No. 355,920. Patented Jan. 11, 1887.
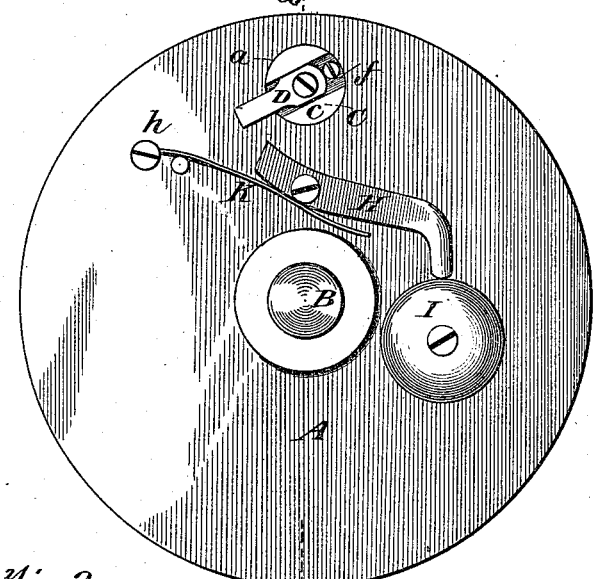
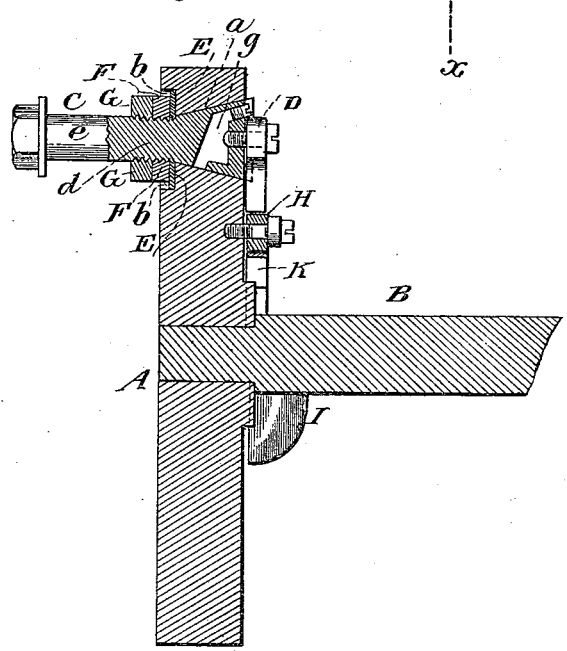
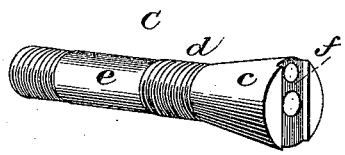
Witnesses.
A. Ruppert.
Alfred T. Gage.
Inventor:
Fred C. Chase
by Franklin H. Hough
Atty.

UNITED STATES PATENT OFFICE.

FRED. C. CHASE, OF LOWVILLE, NEW YORK, ASSIGNOR OF ONE HALF TO CHARLES A. MILLS, OF SAME PLACE.

WRIST-PIN FOR ENGINES.

SPECIFICATION forming part of Letters Patent No. 355,920, dated January 11, 1887.

Application filed September 23, 1886. Serial No. 214,353. (No model.)

*To all whom it may concern:*

Be it known that I, FRED. C. CHASE, a citizen of the United States, residing at Lowville, in the county of Lewis and State of New York, have invented certain new and useful Improvements in Wrist-Pins for Engines; and I do hereby declare the following to be a full, clear, and exact description of the invention, such as will enable others skilled in the art to which it appertains to make and use the same, reference being had to the accompanying drawings and letters of reference marked thereon, which form a part of this specification.

Like letters refer to similar parts throughout the several views.

A serious objection to steam-engines and other classes of machinery in which wrist-pins are used has been that in case of accelerated or abnormal speed, as well as under other conditions, the wrist-pin becomes heated to such a degree as to be twisted off or otherwise injured, necessitating the stopping of the engine while the damage is repaired.

To overcome this objection is the object of my invention.

In the accompanying drawings I have shown what at present I consider the preferable form of my improvement; but I do not wish to limit myself in the appended claims to the form shown, as the same may be varied within certain limits without departing from the spirit of my invention.

In said drawings, Figure 1 is a plan, Fig. 2 a section on line $x\ x$ of Fig. 1, and Fig. 3 a perspective, of the wrist-pin detached.

Referring by letter to said drawings, A represents a disk, such as is ordinarily used in steam-engines, and which is shown as attached to a shaft, B. Instead of forming the wrist-pin integral with or rigidly securing it to the disk, I connect these parts in the following manner: I form the disk near its outer edge with an aperture, $a$, which aperture is tapered, as clearly shown in Fig. 2, for a purpose hereinafter described, and upon its outer face, surrounding this aperture, the disk is formed with a countersunk portion, $b$, as shown in the same figure. The wrist-pin C (shown detached in Fig. 3) is formed as follows: The head $c$ is tapered to correspond with the taper of the aperture in the disk. The shank of the wrist-pin is threaded, as shown at $d$, beyond which is a plain portion, $e$, to receive the pitman or connecting-rod, beyond which smooth portion the shank is screw-threaded to receive a nut to secure said pitman, although this latter threaded portion may be plain and the pitman secured in any suitable way—for instance, by a key.

D is a dog secured to the head $c$ in any suitable manner, in the present instance being shown as secured by means of a screw engaging a threaded aperture in the head. The head is also shown as being formed with a transverse channel, $f$, to receive and hold the dog from displacement; but this channel is not essential, and I may sometimes omit it.

In order to provide for the proper lubrication of the wrist-pin, I form the head thereof with an oil-chamber, $g$, as shown in Fig. 2, said chamber communicating with the aperture in the disk, which forms a bearing for said wrist-pin, through an opening in the side of the head; but this even is not essential to the accomplishment of the end in view, as other means of lubricating may be employed, if preferred.

E is a washer sleeved on the shank of the wrist-pin within the countersunk portion $b$ of the disk.

F is a nut on the threaded portion $d$ of the wrist-pin, and G is a similar nut engaging said threaded portion and bearing against the nut F. In practice these nuts are so adjusted that under normal conditions and speed the wrist-pin will be held against turning in its bearings; but under accelerated or abnormal speed, or, as often happens in new machinery, overheating without increase of speed, the pin will revolve in its bearings, carrying with it, of course, the dog D, which is designed to sound an alarm through the medium of the following mechanism:

H is a lever pivoted upon the inner face of the disk, with its short arm arranged in the path of the dog D, its other arm designed to contact with a gong, I. Under normal conditions this lever remains as shown in Fig. 1; but when the wrist-pin revolves in its bearings the dog D comes in contact with the short arm of the lever, throwing up its other arm, which, as it falls, strikes the gong I and sounds an alarm.

To insure the return of the lever to its normal position after being struck by the dog, I provide the spring K, one end secured to the stud $h$, secured to the inner face of the disk, and its other end arranged under the said lever.

The taper of the head of the wrist-pin and the aperture in the disk, together with the adjusting-nuts F and G, admit of varied adjustments, as will be readily understood.

Having thus described my invention and set forth its merits, without limiting myself to the precise construction shown or its application to a steam-engine, what I claim as new is—

1. A wrist-pin normally rigid in its bearings and abnormally rotatable therein, substantially as described.

2. A wrist-pin normally rigid in its bearings and abnormally rotatable therein, combined with an alarm sounded by said wrist-pin when it rotates in its bearings, substantially as and for the purpose specified.

3. The combination, with a wrist-pin normally rigid in its bearings, but adapted to rotate therein under abnormal conditions, of an alarm, and a dog carried by said wrist-pin and adapted to sound the alarm, substantially as described.

4. The combination, with the disk having tapered aperture, of a wrist-pin having tapered head inserted in said aperture and provided with the adjusting-nuts F G and washer E, substantially as and for the purpose specified.

5. The combination, with the disk and abnormally-rotating wrist-pin, of a dog on said wrist-pin, and a gong on said disk, and a lever also on said disk, with one arm arranged in the path of said dog, substantially as and for the purpose specified.

6. The combination, with a disk and abnormally-rotating wrist-pin, of a dog on said wrist-pin, a gong on said disk, a lever arranged with one arm in the path of said dog, and a spring bearing on said lever, substantially as and for the purpose specified.

In testimony whereof I affix my signature in presence of two witnesses.

FRED. C. CHASE.

Witnesses:
J. P. BOWMAN,
GEORGE SHERWOOD.